Dec. 25, 1962
R. SEIFERT
3,070,079
GUDGEON PIN LUBRICATING SYSTEM
Filed March 6, 1961
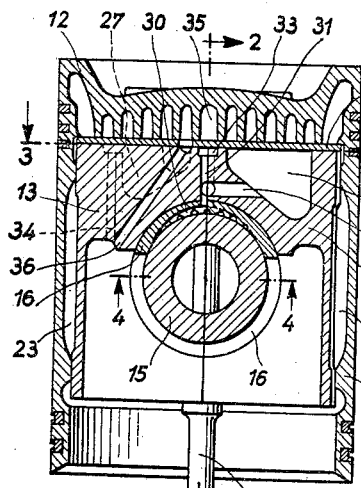
FIG. 1
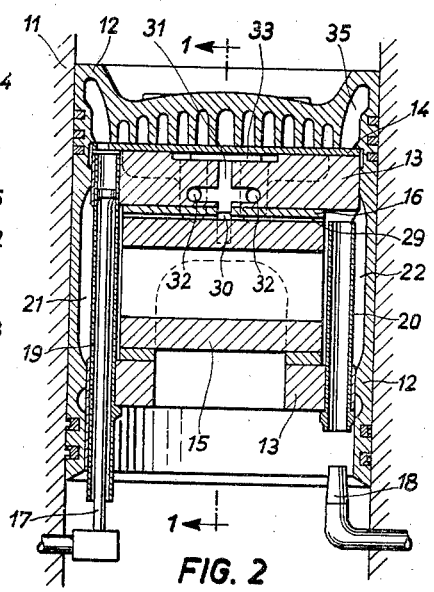
FIG. 2
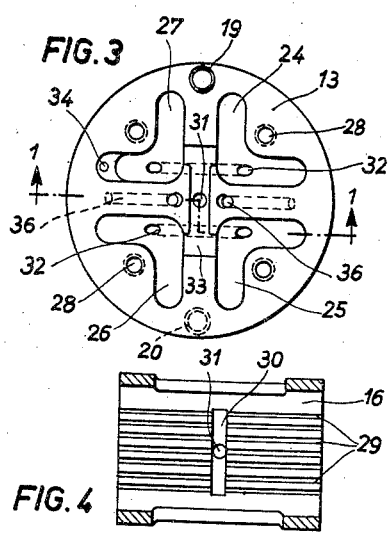
FIG. 3
FIG. 4
FIG. 6
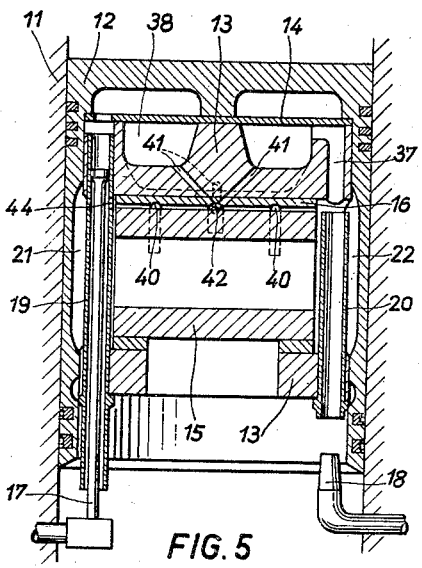
FIG. 5
INVENTOR
RICHARD SEIFERT
BY K. A. Mayr
ATTORNEY United States Patent Office 3,070,079
Patented Dec. 25, 1962

3,070,079
GUDGEON PIN LUBRICATING SYSTEM
Richard Seifert, Friedrichshafen-Manzell, Germany, assignor to Maybach-Motorenbau G.m.b.H., Friedrichshafen, Germany, a firm
Filed Mar. 6, 1961, Ser. No. 93,561
Claims priority, application Germany Mar. 10, 1960
7 Claims. (Cl. 123—41.36)

This invention relates to a gudgeon pin lubricating arrangement, particularly for two-cycle internal combustion engines wherein the lubricant is supplied by one or more lubricant feed devices, such as tubes, nozzles, or the like, fixed to the engine housing and telescopingly cooperating with tubes fixed in the piston. Such lubricating arrangements have the disadvantage that, because of the reciprocating motion of the piston and the accelerations and decelerations caused thereby, the lubricant is not uniformly supplied and distributed to the lubrication points. The provision of nonreturn valves cannot essentially alter this.

According to the invention the pulsating flow caused by the reciprocating motion is deliberately utilized. At least one lubricant collecting chamber is provided at each end of the gudgeon pin bearing and a further collecting chamber is provided above the gudgeon pin in the gudgeon pin carrier, these collecting chambers being interconnected by a system of lubricating grooves in the gudgeon pin bearing and by passages in the gudgeon pin carrier and connecting the system of lubricating grooves to the collecting chamber above the gudgeon pin. As the rate of flow of lubricant supplied is greater than the rate of flow of oil returned from the collecting chambers, a kind of pilgrim step motion takes place in the lubricating system which effects satisfactory cooling of the parts surrounding the gudgeon pin.

In an embodiment of the invention the lubricant is conveyed into the collecting chambers at the ends of the gudgeon pin bearing and the collecting chamber above the gudgeon pin has at least one overflow over which the lubricant flows, if desired, into the crankcase.

In another embodiment of the invention the lubricant is conveyed partly into the collecting chamber or chambers at the gudgeon pin, and partly into the collecting chamber above the gudgeon pin and flows from the system of lubricating grooves in the gudgeon pin bearing into the crankcase.

The collecting chambers at the ends of the gudgeon pin are advantageously interconnected by an annular space. They may also be connected through the hollow gudgeon pin.

In pistons whose head portion is cooled by lubricating oil the lubricating system according to the invention may be combined with the cooling system whereby the same lubricant supply device is used for feeding lubricant to the cooling means in the piston head as well as to the lubricating system.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIG. 1 is a longitudinal section through a piston according to the invention, the section being made along lines 1—1 in FIG. 2 and in FIG. 3.

FIG. 2 is a longitudinal section of the piston shown in FIG. 1, the section being made along line 2—2 in FIG. 1.

FIG. 3 is a plan view of the gudgeon pin carrier of the piston shown in FIGS. 1 and 2, looking in the direction of the arrows 3 in FIG. 1.

FIG. 4 is a longitudinal section through the gudgeon pin bearing bush forming part of the piston shown in FIGS. 1–3, looking in the direction of the arrows 4 in FIG. 1.

FIG. 5 is a longitudinal section of a modified piston according to the invention.

FIG. 6 is a longitudinal section of a gudgeon pin bearing bush forming part of the piston shown in FIG. 5.

Like parts are designated by like numerals in the several figures.

Numeral 11 designates a portion of the engine cylinder and numeral 12 the main body of a piston reciprocating in the cylinder. A gudgeon pin carrier 13 is placed inside the piston body 12 and is separated from the piston head part of the body 12 by means of a plate 14. A gudgeon pin 15 rests in a bushing 16 mounted in the carrier 13. Numeral 17 designates a supply tube for lubricating oil which tube is connected to the engine casing. Numeral 18 designates a stationary lubricating oil supply nozzle which is also made fast on the engine casing. The supply tube 17 extends into a lubricant supply tube 19 which is rigidly connected to the piston and more particularly to the gudgeon pin carrier 13. The nozzle 18 cooperates with a lubricant supply tube 20 also rigidly connected to the piston and, in the illustrated example, to the gudgeon pin carrier 13 thereof. The inside of the piston body 12 has a recessed portion opposite one end of the gudgeon pin 15 forming an oil collecting chamber 21 and has a second recessed portion opposite the second end of the gudgeon pin 15 forming an oil collecting chamber 22.

For the sake of clarity no connecting rod extending from the gudgeon pin in the conventional manner is shown.

In the embodiment of the invention shown in FIGS. 1 to 4 an annular space 23 is formed by suitable recesses on the inside of the body 12 and on the outside of the carrier 13, the space connecting the collecting chambers 21 and 22 which are also connected for lubricant flow by the hollow gudgeon pin 15. Four collecting chambers 24 to 27 are provided in the top of the gudgeon pin carrier 13. The plate 14 rests on the surfaces between the cavities forming the collecting chambers 24 to 27. Threaded bores 28 are provided in the carrier 13 outside the chambers 24 to 27 for receiving bolts for fixing the gudgeon pin carrier 13 to the main body 12 of the piston. The system of lubricating grooves in the gudgeon pin bearing bush 16 consists of longitudinal grooves 29 and a transverse groove 30 (FIG. 4). From this transverse groove 30 a duct 31 leads through the gudgeon pin bearing bush 16 and the gudgeon pin carrier 13 into a distributor duct system 32 which terminates in the upper collecting chambers 24 to 27. Below the plate 14 the four collecting chambers 24 to 27 are connected by an I-shaped recess 33 which is connected to the duct 31. The collecting chamber 27 is provided with an overflow 34.

The coolant oil for the piston is fed through the tube 17 to the tube 19 fixed in the piston and flows therefrom into a coolant system 35, for example, in the form of a spiral passage in the head of the main piston body 12. The coolant oil returns from the center of the passage through ducts 36 into the crankcase.

Independently of the aforesaid system lubricating oil is injected from the nozzle 18 through the tube 20 fixed in the piston into the collecting spaces 21 to 23. The oil is passed through the longitudinal grooves 29 of the gudgeon pin bearing bush 16 and through the ducts 31 and 32 into the upper collecting chambers 24 to 27. By suitably relating the rate of feed of oil to the nozzle 18 to the pulsating pumping effect of the reciprocal motion of the piston, a more vigorous flow of oil in the direction toward the upper collecting chambers can be obtained than in the opposite direction. This pilgrim step motion effects not only good lubrication of the gudgeon pin 15 but also proper cooling of the bearing 16. Excess oil can flow away through the overflow duct 34.

In the arrangement according to FIGS. 5 and 6 lubricating oil is fed through the tube 20 into the collecting chambers 21 and 22 and through a duct 37 coaxial of the tube 20 into a collecting chamber 38 above the gudgeon pin 15. The lubricating oil flows also through longitudinal grooves 39 in the gudgeon pin bearing bush 16 to transverse grooves 40 wherefrom it can freely discharge. The central part of the bearing bush 16 is fed from the upper annular collecting chamber 38 through ducts 41 and a distributor groove 42 from which the oil emerges into longitudinal grooves 43 and discharges through the transverse grooves 40. There is a pulsation of greater or less intensity through the longitudinal grooves 39 and 43 after acceleration or deceleration of the oil.

In both embodiments the lubricating oil tube 20 fixed in the piston extends substantially as far as the upper lubricating grooves 29 or 39 of the gudgeon pin bearing bush 16.

Lubricating oil can also be tapped from the coolant oil feed tube 19 through an aperture 44 (FIG. 5).

Instead of being fed by the nozzle 18 the lubricating oil can also be fed through a sliding tube arrangement as is provided for the cooling oil. In this case the sliding tube feeds the lubricating oil through an aperture into the collecting chamber 22 and after sliding over this aperture feeds exclusively into the upper collecting chamber 38. Additional provisions are made for feeding the coolant.

I claim:
1. In an internal combustion engine, a piston including a carrier, a gudgeon pin bearing made fast on said carrier and having a bearing surface, a gudgeon pin movable inside of said bearing relative to said piston and having a surface engaging said bearing surface: a lubricant collecting chamber adjacent to each end of said gudgeon pin bearing, lubricant conducting channels formed by said surfaces and communicating with said collecting chambers, an additional lubricant collecting chamber placed in said carrier above said bearing, lubricant supply means connected to at least one of said chambers for supplying lubricant thereto, and lubricant conduit means interconnecting said lubricant conducting channels and said additional chamber.

2. In an internal combustion engine as defined in claim 1 wherein said lubricant conducting channels interconnect said lubricant collecting chambers at the ends of the gudgeon pin bearing for lubricant flow, said lubricant supply means is connected to said collecting chambers at the ends of said gudgeon pin bearing, and an overflow means is connected to said additional lubricant collecting chamber for relieving lubricant therefrom.

3. In an internal combustion engine as defined in claim 1 wherein said lubricant supply means is connected for lubricant flow to all of said chambers, and lubricant relief means are connected to said lubricant conducting channels for relieving lubricant therefrom.

4. In an internal combustion engine as defined in claim 1 wherein said lubricant supply means includes a tube rigidly connected to said piston and terminating substantially at the elevation of the upper portions of said surfaces and the lubricant conducting channels thereat.

5. In an internal combustion engine as defined in claim 1 wherein said piston has a head portion including cooling means for cooling said head portion by a lubricant, and said lubricant supply means are also connected for lubricant supply to said cooling means.

6. In an internal combustion engine as defined in claim 1 wherein said additional lubricant collecting chamber is divided into a plurality of communicating spaces.

7. In an internal combustion engine as defined in claim 1 wherein said additional lubricant collecting chamber is divided into a plurality of spaces, conduit means being connected to the uppermost parts of said spaces for interconnecting said spaces, and overflow means being connected to the uppermost part of at least one of said spaces for relieving lubricant therefrom.

References Cited in the file of this patent

UNITED STATES PATENTS

| | | |
|---|---|---|
| 1,425,151 | Verhey | Aug. 8, 1922 |
| 1,583,286 | Fekete | May 4, 1926 |
| 2,407,429 | Kuttner | Sept. 10, 1946 |
| 2,720,193 | Maybach | Oct. 11, 1955 |